United States Patent
Robitaille et al.

(10) Patent No.: US 10,291,484 B2
(45) Date of Patent: *May 14, 2019

(54) SYSTEM AND METHOD FOR OUT-OF-LINE REAL-TIME IN-SERVICE PERFORMANCE MEASUREMENT

(71) Applicant: Accedian Networks Inc., Saint-Laurent (CA)

(72) Inventors: Claude Robitaille, St-Placide (CA); Chris Reamy, Colorado Springs, CO (US); Germain Levesque, Saint-Laurent (CA)

(73) Assignee: Accedian Networks Inc., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/784,339

(22) Filed: Oct. 16, 2017

(65) Prior Publication Data

US 2018/0041399 A1    Feb. 8, 2018

Related U.S. Application Data

(63) Continuation of application No. 15/047,031, filed on Feb. 18, 2016, now Pat. No. 9,819,553, which is a continuation of application No. 14/254,932, filed on Apr. 17, 2014, now Pat. No. 9,300,565.

(51) Int. Cl.
*H04L 12/26* (2006.01)
*H04L 12/24* (2006.01)
*H04L 12/46* (2006.01)

(52) U.S. Cl.
CPC ........ *H04L 41/145* (2013.01); *H04L 12/4641* (2013.01); *H04L 41/14* (2013.01); *H04L 43/026* (2013.01); *H04L 43/0823* (2013.01); *H04L 43/0852* (2013.01); *H04L 43/0888* (2013.01); *H04L 43/12* (2013.01); *H04L 43/18* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 5,793,976 A * | 8/1998 | Chen | H04L 43/0852 370/252 |
| 6,901,357 B1 * | 5/2005 | Patiejunas | H04L 43/50 370/235 |
| 8,705,395 B2 | 4/2014 | Scott | |

(Continued)

*Primary Examiner* — Anh Vu H Ly
(74) *Attorney, Agent, or Firm* — Stratford Managers Corporation

(57) ABSTRACT

A system for out-of-line testing of performance of a network, comprising a multiplexer at an input to the network; a demultiplexer at an output from the network; the multiplexer further comprising a traffic generator to insert synthetic traffic, and a first switch to accept an incoming customer traffic stream and join the incoming customer traffic stream with a synthetic traffic stream to form a total traffic stream, the total traffic stream fed to the input to the network; and the demultiplexer comprising a second switch to receive the total traffic stream from the output of the network, and separate the total traffic stream into the synthetic traffic stream and the customer traffic stream, and a traffic analyzer to analyze the separated synthetic traffic stream.

8 Claims, 6 Drawing Sheets

(56) References Cited

U.S. PATENT DOCUMENTS

| | | | |
|---|---|---|---|
| 9,300,565 B2 | 3/2016 | Robitaille | |
| 9,819,553 B2 * | 11/2017 | Robitaille | H04L 43/50 370/252 |
| 2003/0108033 A1 * | 6/2003 | Raisanen | H04L 29/06 370/352 |
| 2003/0156548 A1 * | 8/2003 | Sapp | H04L 41/22 370/252 |
| 2004/0236866 A1 | 11/2004 | Dugatkin | |
| 2007/0266148 A1 | 11/2007 | Ruiz | |
| 2010/0008248 A1 | 1/2010 | Constantine | |
| 2011/0261698 A1 | 10/2011 | Kamerkar | |
| 2012/0051234 A1 | 3/2012 | Gintis | |
| 2012/0311132 A1 | 12/2012 | Tychon | |
| 2013/0077500 A1 | 3/2013 | Hutchison | |
| 2014/0254647 A1 | 9/2014 | Stott | |
| 2014/0286174 A1 * | 9/2014 | Iizuka | H04L 43/12 370/241 |
| 2015/0199207 A1 | 7/2015 | Lin | |

\* cited by examiner

SYSTEM AND METHOD FOR OUT-OF-LINE REAL-TIME IN-SERVICE PERFORMANCE MEASUREMENT

CROSS REFERENCE TO RELATED APPLICATIONS

This application is a continuation of and claims priority to U.S. patent application Ser. No. 15/047,031, filed Feb. 18, 2016, now allowed, which claims priority to U.S. patent application Ser. No. 14/254,932, filed Apr. 17, 2014, now U.S. Pat. No. 9,300,565, both of which are hereby incorporated by reference herein in its entirety.

FIELD OF THE INVENTION

The present disclosure relates to Ethernet based mobile and business Ethernet networks.

SUMMARY

A system for out-of-line testing of performance of a network, comprising a multiplexer at an input to the network; a demultiplexer at an output from the network; said multiplexer further comprising a traffic generator to insert synthetic traffic, and a first switch to accept an incoming customer traffic stream and join said incoming customer traffic stream with a synthetic traffic stream to form a total traffic stream, said total traffic stream fed to said input to said network; and said demultiplexer comprising a second switch to receive said total traffic stream from said output of said network, and separate said total traffic stream into the synthetic traffic stream and the customer traffic stream, and a traffic analyzer to analyze said separated synthetic traffic stream.

A method for out-of-line testing of performance of a network, comprising multiplexing, using a multiplexer at an input to the network, an incoming customer traffic stream and a synthetic traffic stream to form a total traffic stream; said multiplexing comprising accepting the incoming customer traffic stream, inserting generated synthetic traffic stream, joining said inserted synthetic traffic stream with said incoming customer traffic stream to form said total traffic stream, and feeding said total traffic stream to said input to said network; demultiplexing, using a demultiplexer at an output from the network, said total traffic stream into said customer traffic stream and said synthetic traffic stream, said demultiplexing comprising receiving said total traffic stream from an output from said network, separating said total traffic stream into the synthetic traffic stream and customer traffic stream, and analyzing said separated synthetic traffic stream.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
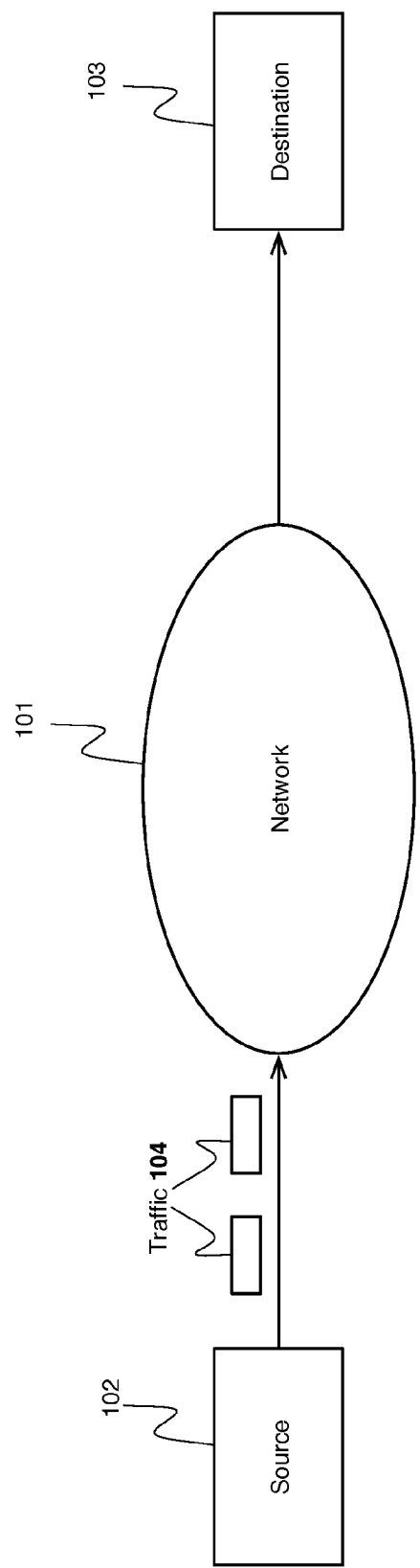
FIG. 1 shows an existing network with a source and destination.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Currently, throughput testing techniques, such as those described in Request For Comments (RFC) 2544 "Benchmarking Methodology for Network Interconnect Devices" or International Telecommunications Union Telecommunication Standardization Sector (ITU-T) standard Y.1564 "Ethernet service activation test methodology", are considered "disruptive" tests and can only be executed by the operators when customer services are not running. This means when a customer calls in to say their service is not performing as expected, the network operator or service provider needs to take the customer out of service to identify the issue. Furthermore, network operators are often hesitant in deploying devices in-line with their customer traffic in fear of disrupting existing customer services.

The system and method described in this specification allows operators to measure available capacity without disrupting existing customer services. The system to be described below enables the network operator to measure real-time traffic throughput under operational conditions, thereby providing operators with accurate metrics including capacity and optionally throughput.

The system and method described in this specification uses customer traffic combined with synthetic traffic generated in real-time to "fill out" the gaps in the customer traffic to form the total traffic for testing. This allows testing of customer service performance during normal business hours, without taking the customer out-of-service. The system and method described in this specification achieves this without network operators having to insert devices in line to perform throughput testing.

FIG. 1 shows an existing network 101, on which throughput and capacity testing is to be performed. The existing network 101 could be any type of network such as, for example, an Ethernet network, a 3G/4G network. It could also be a Local Area Network (LAN), a Wide Area Network (WAN), any type of wired network, an optical network and so on. A customer sends traffic 104 from source 102 to destination 103. This traffic could be, for example, packets or frames or any type of protocol data unit, depending on what network 101 is.

Figure 2:
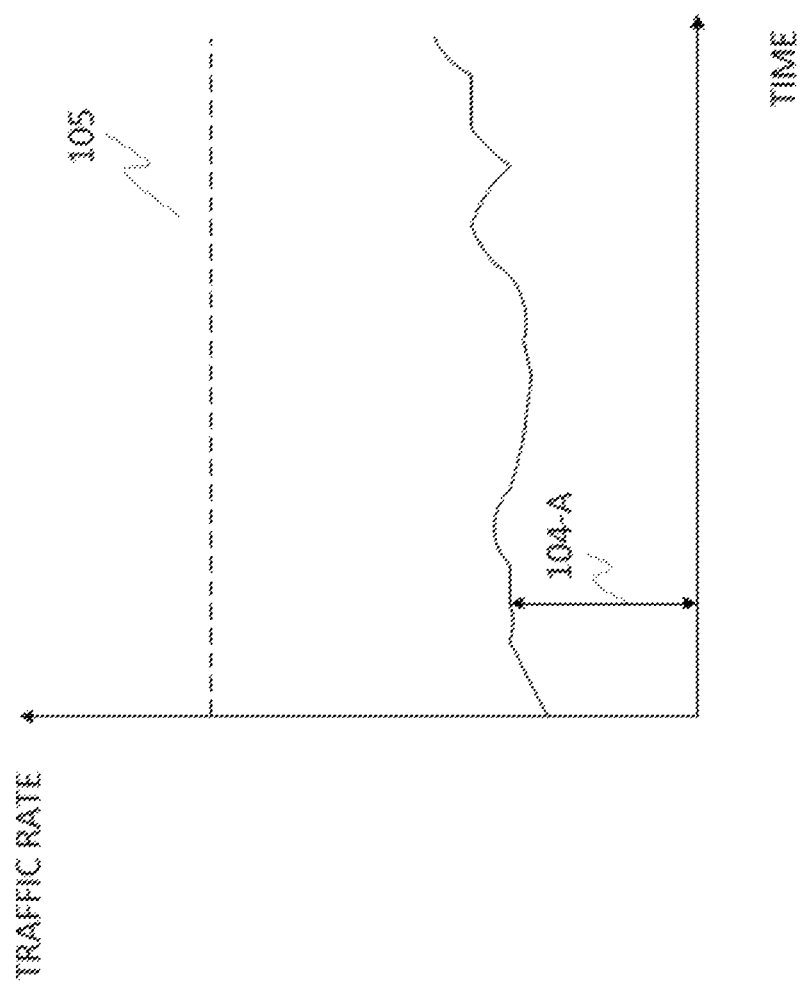
FIG. 2 shows the customer traffic rate over time.

FIG. 2 shows the customer traffic rate 104-A over time. As can be seen in FIG. 2, customer traffic rate 104-A is less than an intended test rate 105 to be used to test existing network 101. In one embodiment, network 101 is an Ethernet network, and customer traffic rate 104-A is the customer traffic rate associated with a virtual circuit in network 101, and intended test rate 105 is the Committed Information Rate (CIR) associated with the virtual circuit in network 101.

Figure 3:
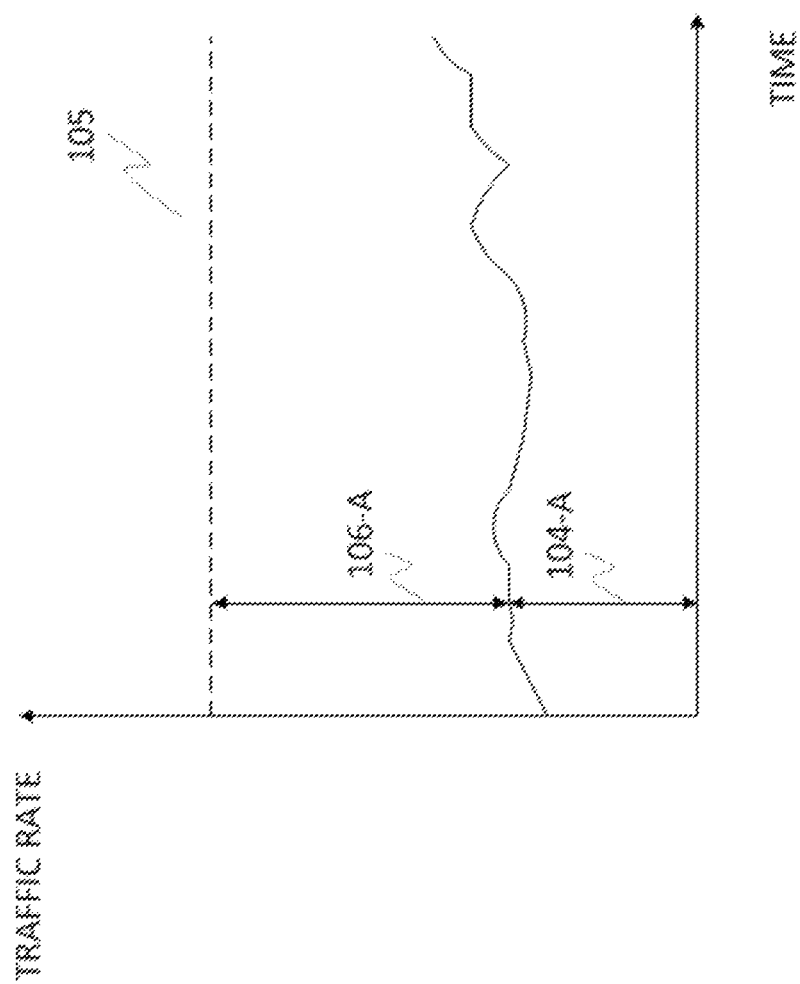
FIG. 3 shows an example of insertion of synthetic traffic at a rate to bring the total traffic rate up to an intended test rate.

Therefore, synthetic traffic can be inserted into the existing network 101 so as to increase the total traffic rate (customer traffic rate plus synthetic traffic rate) to the level of the intended test rate 105, and test the response of network 101 to the total traffic at intended test rate 105. An example is shown in FIG. 3. Synthetic traffic with a rate 106-A is inserted into the network, so as to increase the total traffic rate to intended test rate 105. In one embodiment, network 101 is an Ethernet network. In a further embodiment, the synthetic traffic is used to test a virtual circuit of Ethernet network 101.

Figure 4:
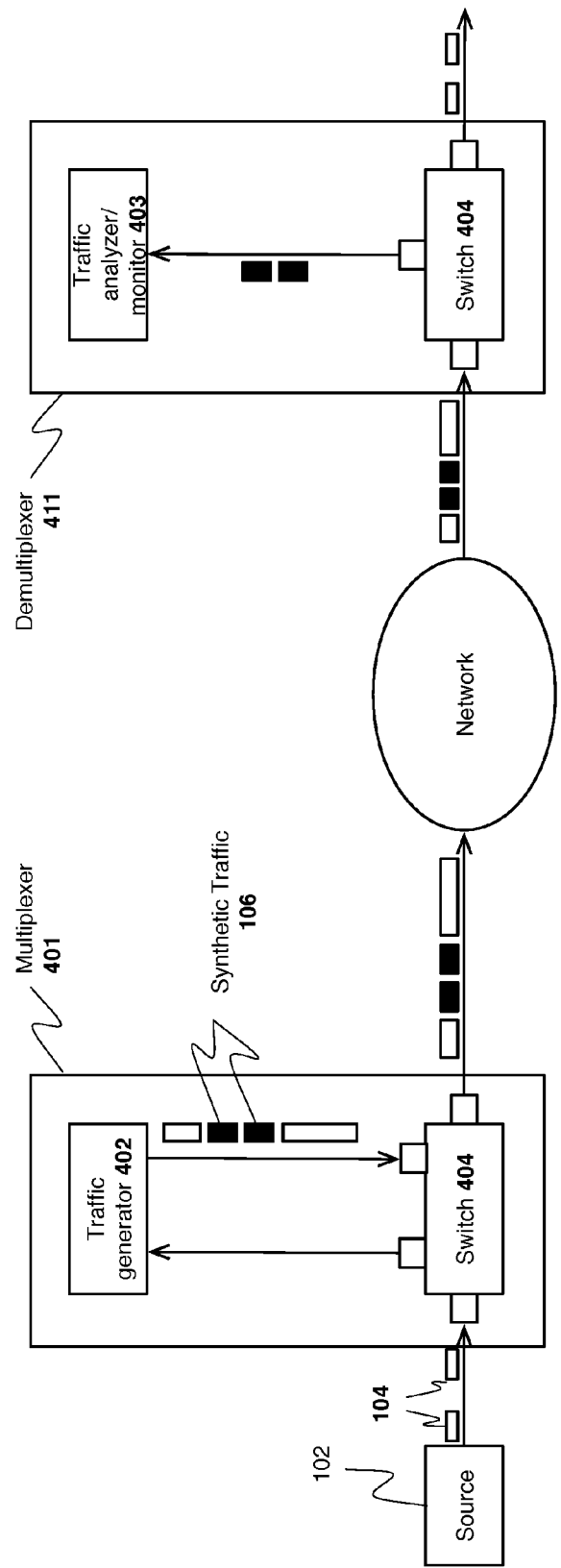
FIG. 4 shows one embodiment of a system to insert synthetic traffic into and remove synthetic traffic from the network.

FIG. 4 shows one embodiment of a system to insert synthetic traffic into and remove synthetic traffic from the network. Multiplexer 401 comprises traffic generator 402, and switch 404. Demultiplexer 411 comprises traffic analyzer/monitor 403 and switch 412.

Traffic generator 402 monitors, in real-time, the customer traffic 104 from source 102 that is being passed on to the network in one direction and adds the necessary amount of synthetic traffic 106 to bring the total traffic rate to the intended test rate 105. The synthetic traffic stream 106 and the customer traffic stream 104 are joined at switch 404.

At the other end, the two streams are separated at switch 412 of demultiplexer 411 into synthetic traffic 106 and customer traffic 104. Traffic analyzer 403 analyzes the synthetic traffic 106 that is received at the other end, computes and displays statistics. In one embodiment, the monitor 403 collects and computes statistics on the number of frames or packets received, error rate and delay measurements. The customer traffic 104 is directed to destination 103.

Figure 5:
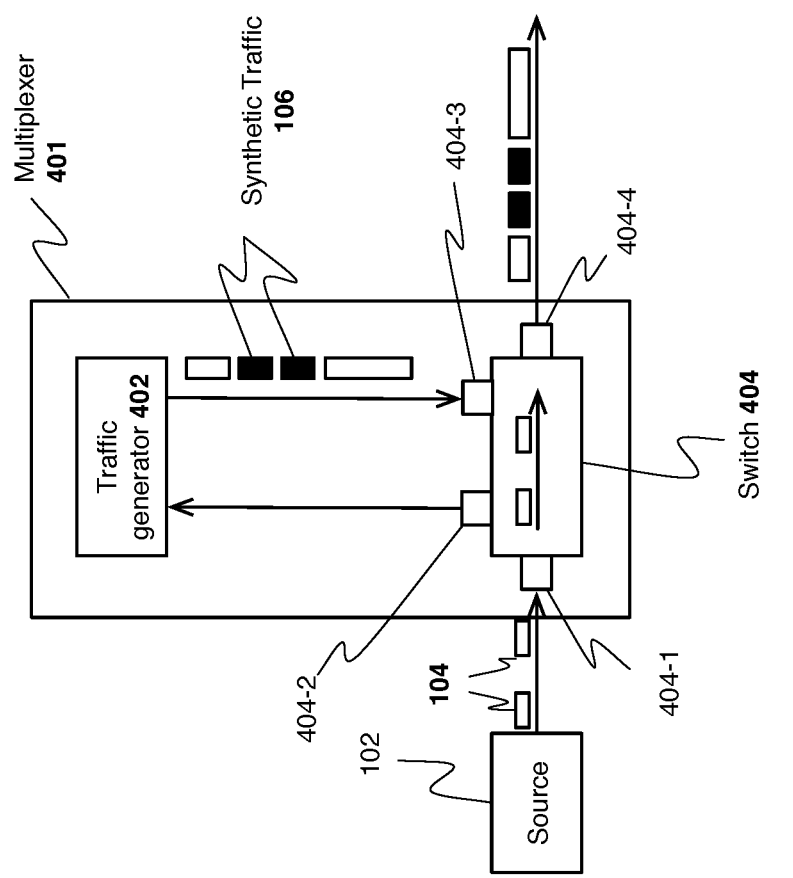
FIG. 5 shows insertion of synthetic traffic using a switch and a generator.

The synthetic traffic 106 should be inserted out-of-line so as to not disrupt customer traffic. FIG. 5 shows out-of-line insertion of synthetic traffic using switch 404 and generator 402. Incoming customer traffic 104 from source 102 is routed from port 404-1 of switch 404 to port 404-4. A copy of the customer traffic is routed to port 404-2 of switch 404 which is connected to traffic generator 402.

In one embodiment, the generator 402 monitors the copy of the incoming customer traffic from port 404-2 in real-time, determines the customer traffic rate 104-A and determines the synthetic traffic rate 106-A needed to bring the total traffic rate to the intended test rate.

In a further embodiment, the generator 402 monitors the incoming customer traffic 104 for gaps such as inter-packet or inter-frame gaps, and inserts synthetic traffic 106 into these gaps as shown in FIG. 5. In a further embodiment, the generator 402 determines whether the inter-packet or inter-frame gaps are greater than a threshold duration before inserting the synthetic packets or frames.

This multiplexed traffic must then rejoin the main stream of customer traffic from port 404-1 to port 404-4. So as to not interfere with the customer traffic, the copy of customer traffic must be removed.

In one embodiment, the copy of customer traffic is removed by traffic generator 402.

In another embodiment, the removal is performed in the following manner: Generator 402 gives the synthetic traffic a different marking from the copy of the incoming customer traffic. For example, generator 402 gives the synthetic traffic the same flow identifier as the incoming customer traffic 104. An example of a flow identifier is a Virtual Local Area Network identification (VLAN ID). Generator 402 then modifies the flow identifier of the copy of the incoming customer traffic so that it is different from the flow identifier of the synthetic traffic. Port 404-3 of switch 404 is set to only accept traffic with the same flow identifier as the incoming customer traffic 104. The copy of the incoming customer traffic is then dropped at port 404-3. The synthetic traffic then goes on to join the main stream of customer traffic from port 404-1 to port 404-4.

Using flow identifiers is one way to mark the synthetic traffic differently from the copy of the customer traffic so as to enable removal of the copy of the customer traffic. Other methods to mark the synthetic traffic as different from the copy of the customer traffic so that the copy of the customer traffic can be removed are also possible, as would be known by those of skill in the art.

In a further embodiment, in order to facilitate easy removal of the synthetic traffic at the output from the network, the synthetic traffic is marked differently from the customer traffic. Methods to mark the synthetic traffic as different are known by those of skill in the art.

In a further embodiment, either the stream of synthetic traffic from 404-3 to 404-4 or the main stream of customer traffic from 404-1 to 404-4 is delayed so that the two streams can be multiplexed in time at port 404-4. In another embodiment, both streams are delayed to ensure correct multiplexing at port 404-4 as shown in FIG. 5. Techniques to achieve this are well known to those of skill in the art and will not be discussed further. The total traffic stream is then routed into existing network 101 as shown in FIG. 5.

Figure 6:
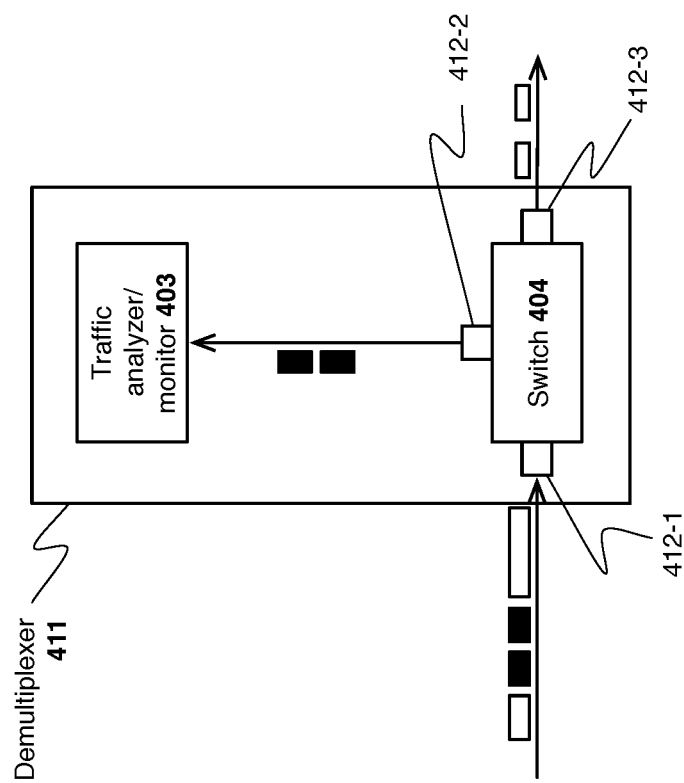
FIG. 6 shows one embodiment of the separation of the total traffic stream into the customer traffic and synthetic traffic streams.

FIG. 6 shows one embodiment of the separation of the total traffic stream into the customer traffic and synthetic traffic streams. At demultiplexer 411, the total traffic stream is received from the output of network 101 at port 412-1 of switch 412. The synthetic traffic 106 is routed to traffic analyzer 403 via port 412-2 of switch 412, and the customer traffic 104 is forwarded without disruption to port 412-3 of switch 412. The separation of the streams is achieved based on the different markings applied to the streams. This way the two streams are demultiplexed.

The synthetic traffic 106 is then analyzed by analyzer 403 to collect and compute statistics on the number of packets or frames received, error rate and delay measurements. It uses these statistics to determine metrics such as latency, throughput, jitter, bit error rate (BER), packet error rate (PER), throughput and so on.

It would be known by one having skill in the art that the out-of-line method described above could be generalized to networks having more than one input and more than one output, or networks having more than one source and more than one destination. Furthermore it would be known by one of skill in the art that while the foregoing example refers to Ethernet networks, the techniques described above are not limited to Ethernet networks.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system for testing the performance of a network between a source and a destination, comprising:
    an input port configured to receive a plurality of original customer packets originating from said source, said input port producing a copy of each of said plurality of original customer packets and routing said copy of customer packets to a second port; and
    a traffic generator coupled to said second port, to determine the rate of said copy of customer packets and generate synthetic packets at a synthetic packet rate such as to bring a total traffic rate to a testing rate;
    said traffic generator inserts said synthetic packets when detecting gaps in the copy of customer packets and removes said copy of customer packets before merging the synthetic packets with the original customer packets and transmitted towards said destination.

2. The system of claim 1 wherein said total traffic rate is the combination of a customer packets rate and the synthetic packets rate.

3. The system of claim 1 wherein said input port modifies said copy of said plurality of customer packets to comprise a second flow identifier different from a flow identifier in said original customer packets.

4. The system of claim 1 wherein said traffic generator generates synthetic packets when said gaps are greater than a predetermined threshold.

5. A method to evaluate the performance of a network configured between a source and a destination, the method comprising:
    receiving from said source, a plurality of original customer packets;
    producing a copy each of said plurality of original customer packets;
    estimating an arrival rate of said copy of customer packets and generating one or more synthetic packets and at second rate such that a total traffic rate reaches an intended test rate;
    inserting said synthetic packets within one or more gaps in the copy of said plurality of original customer packets;
    removing said copy of customer packets;
    multiplexing said synthetic packets with said original customer packets to produce a combined stream of packets; and
    transmitting said combined stream of packets toward said destination.

6. The method of claim 5 wherein said total traffic rate is the combination of said arrival rate and second rate.

7. The method of claim 5 further comprising modifying said copy of customer packets to comprise a second flow identifier different from a flow identifier in said original customer packets.

8. The method of claim 5 wherein said inserting said synthetic packets is done when said gaps are greater than a predetermined threshold.

* * * * *